Sept. 11, 1934.  A. H. WALKER  1,973,588
CHANGE-OVER APPARATUS
Filed Aug. 24, 1933  4 Sheets-Sheet 1

A. H. Walker Inventor
By C. A. Snow & Co.
Attorneys.

Sept. 11, 1934.  A. H. WALKER  1,973,588
CHANGE-OVER APPARATUS
Filed Aug. 24, 1933   4 Sheets-Sheet 2
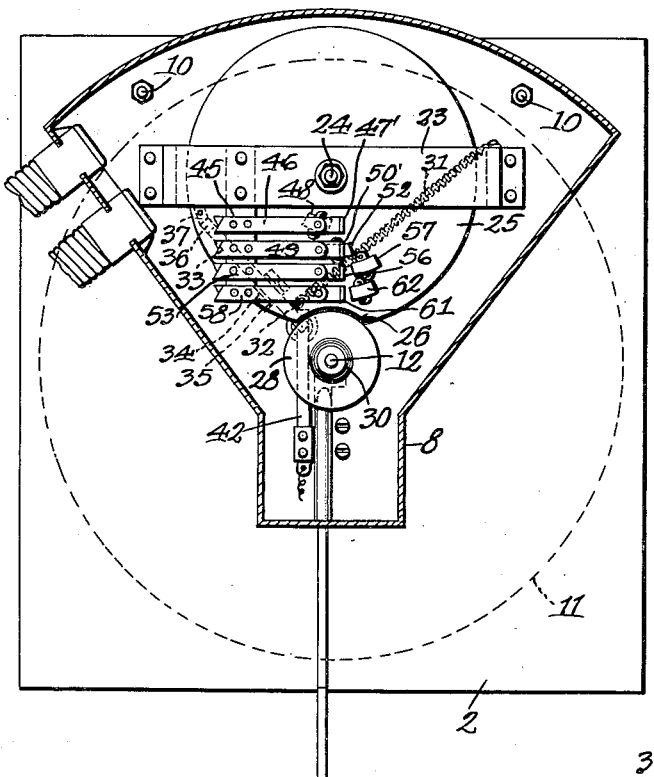
Fig. 4.
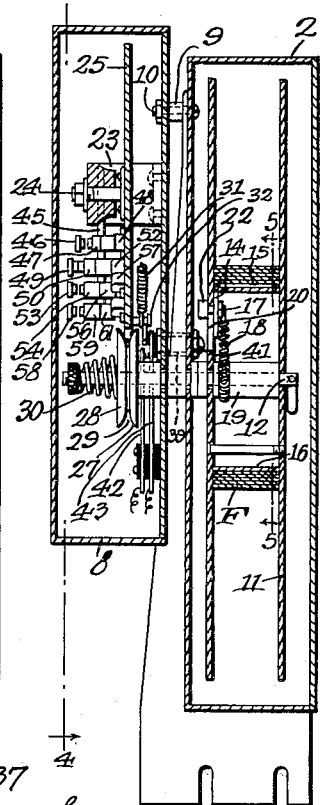
Fig. 3.
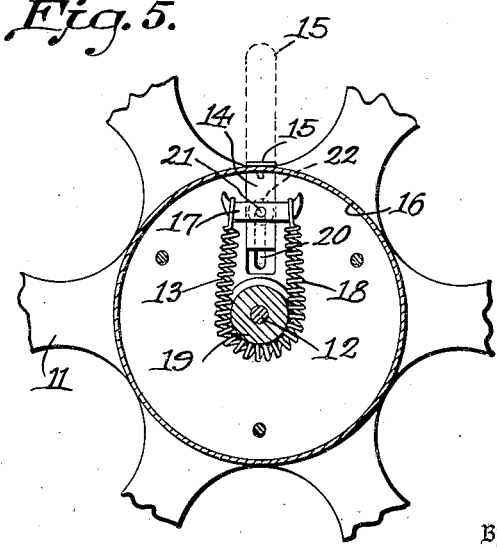
Fig. 5.
Fig. 6.
A. H. Walker  Inventor
By C. A. Snow & Co.
Attorneys.

Sept. 11, 1934. A. H. WALKER 1,973,588
CHANGE-OVER APPARATUS
Filed Aug. 24, 1933 4 Sheets-Sheet 3
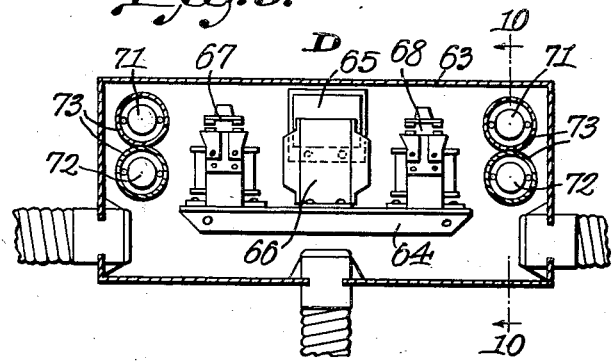
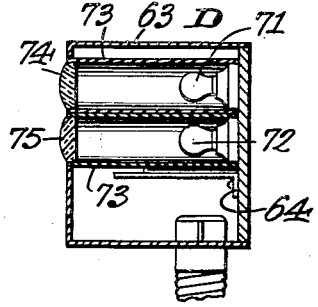
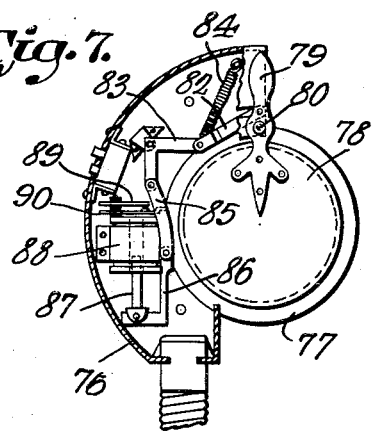
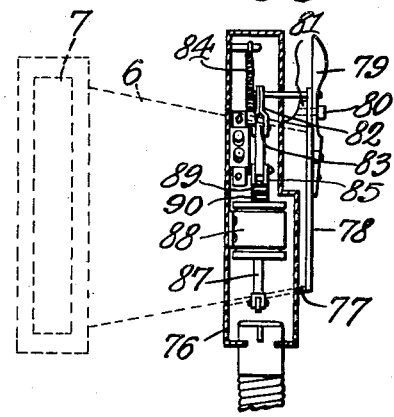
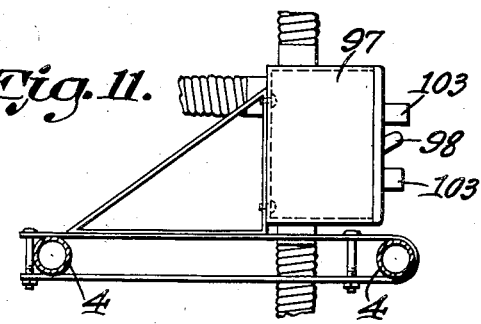
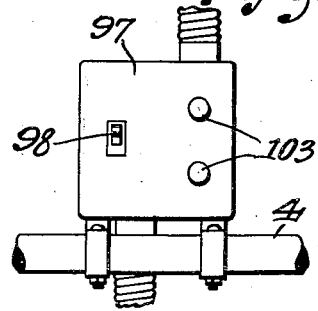
A. H. Walker Inventor Sept. 11, 1934.  A. H. WALKER  1,973,588
CHANGE-OVER APPARATUS
Filed Aug. 24, 1933  4 Sheets-Sheet 4

A. H. Walker Inventor
By C. A. Snow & Co.
Attorneys.

Patented Sept. 11, 1934

1,973,588

UNITED STATES PATENT OFFICE 1,973,588

CHANGE-OVER APPARATUS

Albert Harrison Walker, Kaufman, Tex.

Application August 24, 1933, Serial No. 686,631

14 Claims. (Cl. 88—17)

This invention relates to change-over apparatus for use in connection with projection and sound apparatus such as used in moving picture theatres.

It is an object of the invention to provide a means whereby the projection and sound can be changed automatically from one machine to another, the action being positive and accurate and the apparatus operating at the same time to signal the operator that the change is being made.

A further object is to provide simple and efficient film controlled means which can be set readily to any desired position on the film and which, when released by the film will throw into action the change-over mechanism forming the subject matter of this invention.

Another object is to dispense with the necessity of marking the films and watching cues indicating when changes are to be made, it being possible, when this apparatus is employed, to eliminate the use of white and black screens.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 3 is a section on line 3—3, Figure 2.

Figure 4 is a section on line 4—4, Figure 3.

Figure 5 is an enlarged section through the hub portion of the film reel and showing the film controlled slide in set position in full lines and in released position in dotted lines.

Figure 6 is an enlarged section through a portion of the top magazine and the switch housing, showing the slide operated plunger and the parts actuated thereby.

Figure 7 is a front elevation of the dowser of one of the projection machines, its operating mechanism being shown and the housing for said mechanism being broken away.

Figure 8 is a side elevation of the structure shown in Figure 7, the housing of the dowser mechanism being in section and the tapered portion of the lamp house on which it is mounted being indicated by broken lines.

Figure 9 is a vertical transverse section through the signal housing.

Figure 10 is a section on line 10—10, Figure 9.

Figure 11 is a side elevation of the switch box located under each of the projection machines.

Figure 12 is a front elevation thereof.

Figure 1:
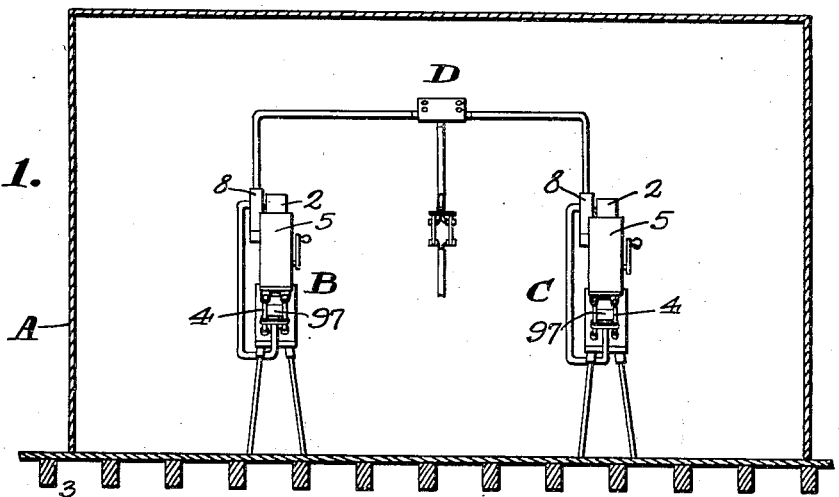
Figure 1 is an elevation, more or less in diagram, of the complete apparatus, the booth in which it is located being shown in section.

Referring to the figures by characters of reference A designates the operator's booth in which are located two projection machines of any make preferred. In Figure 1 these machines have been indicated generally at B and C. A signal box, indicated at D, is located at a point where it can be seen readily by the operator. It is preferably located between the projection machines slightly above the level of the eyes of the operator.

The projection machines are duplicates and each of them is equipped with the same kind of controlling mechanism. Therefore a description of one of the machines and the parts thereon will apply to both.

Figure 2:
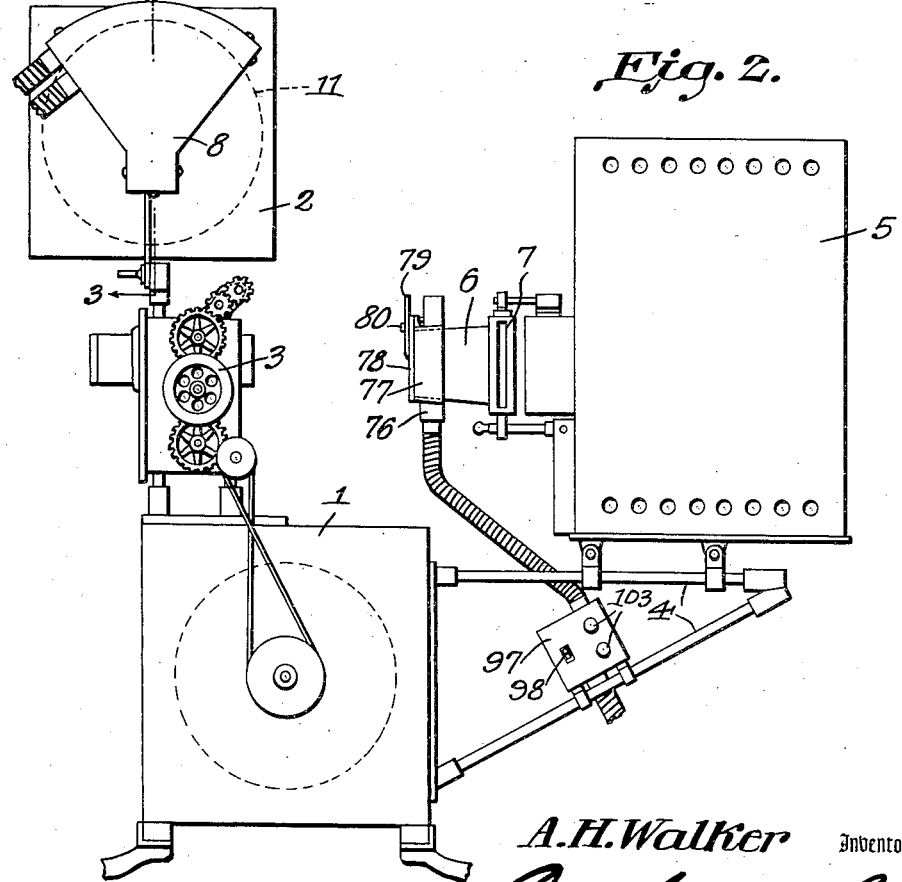
Figure 2 is a side elevation of one of the projection machines with the present equipment combined therewith.

In Figure 2 the projection machine includes a lower film magazine 1, an upper film magazine 2, interposed film feeding mechanism indicated generally at 3, a frame 4 projecting from the magazine 1, a lamp housing 5 mounted on this frame, and a tapered or conical tubular light shield 6 extending forwardly from a slide carrier 7. These parts are all common to certain types of machines and in themselves constitute no part of the present invention.

Secured to one side of the magazine 2 is a switch housing 8, this housing being suitably spaced from the magazine by sleeves 9 or the like mounted on the connecting bolts 10.

The upper film reel 11 located in magazine 2 is supported by and adapted to rotate a shaft 12 journalled in the adjoining walls of the magazine and the switch housing. One side of the hub of this reel 11 has a guide groove 13 in which is mounted a slide 14. A flap 15 is hingedly connected to the outer end of the slide and is adapted to rest upon and extend transversely of the hub 16 of the wheel when held under restraint by the film on the reel. Obviously this flap could be interposed between any predetermined convolutions of the film, all of which would depend upon the point in the film where the flap is to be released thereby.

A crosshead 17 is connected to the slide and has its ends engaged by the ends of a coiled spring 18 which is looped about the centering sleeve 19 of the hub through which shaft 12 extends.

A slot 20 extends longitudinally of groove 13 and slidable therein is a stud 21 the outer end of which carries a cam 22 in the form of a V-shaped block. This block and its stud are held normally adjacent the outer end of slot 20 at which time spring 18 is under tension. When flap 15 is released it will swing outwardly under action of spring 18 as shown by dotted lines in Figure 5 and allow the slide 14 and block 22 to move toward shaft 12.

Secured within the housing 8 is a bracket 23 in which is journalled a stud 24 extending from the center of a disk 25. This disk is provided in its periphery with a segmental recess 26 in which are normally seated opposed disks 27 and 28 which are bevelled or rounded to produce an annular groove 29 therebetween into which the periphery of the disk 25 is adapted to extend. These disks thus form a split driving pulley, the parts being held normally pressed together by a spring 30 mounted on that end of shaft 12 within housing 8. The disks of the pulley are keyed on shaft 12 so as to be rotated thereby.

A coiled spring 31 is secured at one end to bracket 23 and at its other end to a stud 32 extending from one side of disk 25. As shown in Figure 4 this spring serves normally to press one end of the wall of recess 26 into engagement with the pulley disks 27 and 28. Actual contact of these parts is ordinarily prevented, however, by a locking lever 33 which is fulcrumed at 34 on a bracket 35 extending from one wall of housing 8. One end of this lever has a head 36 engaged by a tooth 37 on disk 25. A spring 38 bearing against the lever acts to hold head 36 pressed lightly against the disk. Obviously when lever 33 is shifted against its spring 38, head 36 will release tooth 37 and the tensioned spring 31 will pull the end wall of recess 26 into wedging engagement with the pulley disks 27 and 28.

A bearing sleeve 39 connects magazine 2 with the housing 8 and has a plunger 40 slidable therein. One end of this plunger is rounded as shown at 41 and is adapted to be engaged by the cam block 22 when said block is released by the film F as heretofore explained. In other words, following the release of block 22 and its retraction by spring 18 toward shaft 12, the rotation of wheel 11 will cause the cam block to come against the end of the plunger and force said plunger 40 longitudinally into housing 8.

Arranged within the housing 8 are spring contacts 42 and 43 which are normally insulated from each other and from the housing. Contact 43 is longer than contact 42 and extends across the end of plunger 40 and under one end of lever 43. Blocks of insulation, shown at 44, can be used to prevent electrical connections between this contact 43 and the plunger 40 and lever 33.

An arm 45 is extended from the bracket 23 and carries, in the present instance, four sets of contacts. The contacts of each set are insulated from each other and from their supports. These sets are all substantially parallel and extend partly across one face of disk 25 without touching it.

One set of contacts consists of a pair of members 46 and 47 which are normally spaced apart. The contact 47 is provided with a finger or extension 47′ for engagement by an actuating block 48 on the disk 25. Normally this block is out of engagement with finger 48 but will come into contact therewith immediately following the beginning of rotation of the disk. These contacts 46 and 47 control the signal apparatus as hereinafter explained.

A second set of contacts has been indicated at 49, 50 and 51. The intermediate contact 50 normally electrically engages contact 49 but is spaced from contact 51. It has a finger 50′ extending therefrom for normal engagement by an actuating block 52 on the control disk 25 whereby the contacts 50 and 49 are held together. These contacts control the light circuits of the signal mechanism.

A third set of contacts has been indicated at 53, 54 and 55. The intermediate contact 54 normally engages contact 55 and has an actuating finger 56 extending therefrom for contact by a block 57 on the control disk 25. This block is located where it will not engage finger 26 until disk 25 has nearly completed one revolution. Contacts 53, 54 and 55 control the dowser mechanism hereinafter described.

The sound mechanism of the apparatus is controlled by three contacts 58, 59 and 60. The intermediate contact 59 normally engages contact 60 and has an operating finger 61 for actuation by a block 62 on disk 25. This block is located where it will not engage finger 61 until just prior to the completion of one revolution of said disk.

If desired the two blocks 57 and 62 can be adjusted on the disk 25 to advance or delay the actuation of their respective contacts.

Figure 13:
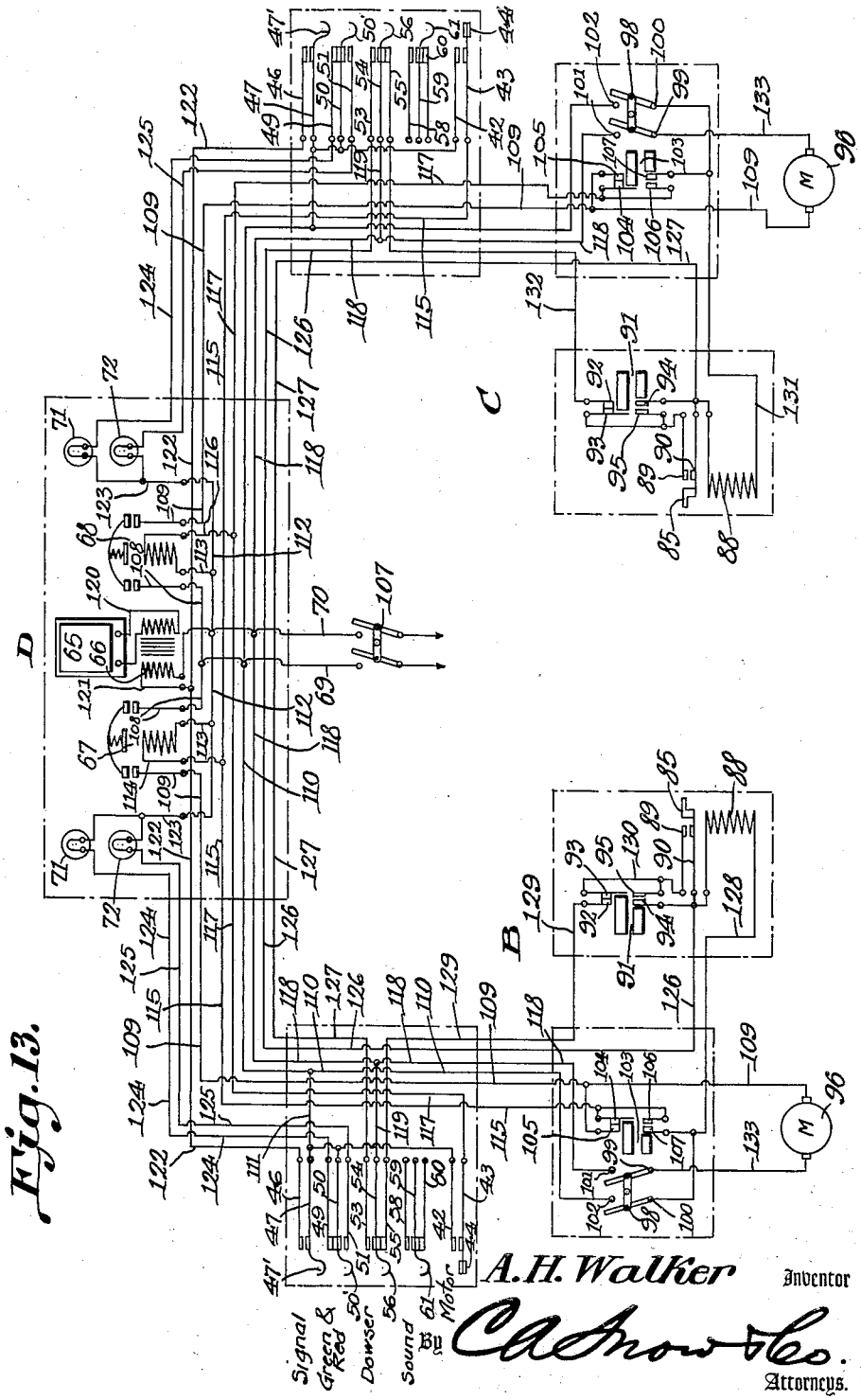
Figure 13 is a view in diagram of the complete apparatus.

The signal mechanism controlled by the contacts 46 and 47 has been illustrated in detail in Figures 9 and 10. It includes a housing 63 containing a bracket 64 on which is mounted a buzzer 65, a buzzer transformer 66 and magnetic switches 67 and 68. The contact 46, as shown in Figure 13, is electrically connected to the transformer 66 which, in turn, is connected electrically to the buzzer 65 as ordinarily.

Feed wires 69 and 70 lead into the housing 63 and arranged in said housing are two pairs of lamps 71 and 72, one pair being provided for each machine. These lamps are arranged in tubular shields 73 at the outer ends of which are located colored lenses. The lens 74 in front of each lamp 71 is preferably green while the lens 75 in front of each lamp 72 is preferably red.

The dowser mechanism which is controlled by the contacts 53, 54 and 55 has been illustrated in detail in Figures 7 and 8. It includes a housing 76 located at one side of a ring 77 adapted to be fitted snugly about the tubular member 6 heretofore mentioned. The dowser 78 has an arm 79 which is pivotally mounted at 80 on a bracket 81 provided therefor. A link 82 connects the arm to one arm of a bellcrank 83 and a spring 84 connects this bellcrank to housing 76 and serves to hold the dowser normally closed. Another link 85 connects the other arm of the bellcrank to a slide 86 carried by the armature 87 of a solenoid 88. Contacts 89 and 90 are so arranged that when the solenoid 88 is energized and its armature actuated the link 85 will move contact 90 into engagement with contact 89 while at the same time the thrust on lever 83 will result in opening the dowser 78.

A switch 91 is located adjacent to the dowser mechanism and includes contacts 92—93 and 94—95.

A motor 96 is provided for each machine and located preferably under each machine on the frame 4 is a switch box 97 containing a main motor controlling switch 98 having terminals 99 and 100 and contacts 101 and 102. Another switch for starting and stopping the motor has been indicated at 103 and is also located in box 97. This switch includes contacts 104—105 and 106—107.

The electrical connections between the various parts of the apparatus have been illustrated in Figure 13. It will be noted that a master switch 107 controls the flow of current to the feed wires 69 and 70. Wire 69 is electrically connected by leads 108 to one contact of each of the magnetic switches 67 and 68. A lead 109 extends from the other contact of each magnetic switch and to the respective machines. Each lead 109 is electrically connected to contact 105 and to one brush of the motor 96.

Feed wire 69 has leads 110 extending to the respective machines. Each of these leads is electrically connected at 111 to the contact 47, contact 50 and contact 42. It is also connected to contact 102.

The feed wire 70 has leads 112 extending therefrom, each being electrically connected at 113 to the coil of one of the magnetic switches. The coil of switch 67 is electrically connected by a lead 114 to a conductor 115 extending to the two machines, it being connected to contacts 104 and 106 in one machine B and contact 43 of the other machine, C.

The coil of the magnetic switch 68 is connected by a lead 116 to conductors 117. One of these conductors extends to the contact 43 of machine B while the other conductor extends to the contacts 104 and 106 of machine C.

Feed wire 70 has leads 118 extending to the respective machines and one of these leads is electrically connected at 119 to the contact 54 of machine B. It is also electrically connected to contact 101 of said machine. The other lead 118 is similarly connected at 119 to the contact 54 of machine C and is also connected to the contact 101 of said machine.

Feed wire 70 is electrically connected to transformer 66 and this transformer is not only connected to the buzzer 65 as indicated at 120 but it is also connected at 121 to conductors 122 extending to the respective machines. One of these conductors 122 leads to contact 46 of machine B while the other conductor 122 leads to contact 46 of machine C.

Each of the leads 112 is connected not only to the coil of one of the switches 67 or 68 but is also connected at 123 to the green and red lamps 71 and 72 of one of the machines. The green lamp 71 of machine B is connected by a conductor 124 to the contact 49 and the lead 125 extending from the red lamp 72 is electrically connected to contact 51 of said machine. A similar arrangement is provided in machine C.

In addition to the electrical connections thus far provided there is a connection 126 which extends from solenoid 88 and contacts 90 and 94 of machine B to contact 53 of machine C. Also there is a connection 127 between contact 53 of machine B and solenoid 88, contact 94 and contact 90 of machine C.

In machine B the solenoid 88 has one terminal electrically connected at 128 to contact 107 and terminal 100 of said machine. Also the contact 55 of machine B is electrically connected at 129 to contact 92 of said machine while the contact 93 is electrically connected at 130 to contacts 95 and 89.

In machine C there is an electrical connection 131 extending from solenoid 88 to contact 107 and terminal 100. This solenoid is also electrically connected to contact 90 and contact 94 as has already been explained. Contacts 89, 95 and 93 of machine C are electrically connected while contact 92 of said machine has a conductor 132 extending therefrom to contact 55.

One brush of each motor 96 is connected to its switch terminal 99 as shown at 133.

As before explained the disks 25 are normally locked against movement while positioned as shown in Figure 4. At this time the contacts 50 are held against contacts 49 so that the green lights 71 will be energized to indicate that the disks are not working. The contacts are held together by the blocks 52 which are normally positioned beneath the fingers 50'.

The magazines of the two machines are loaded with flaps 15 folded between predetermined convolutions of the films at points where the changeover is to occur. As already explained the flaps, when thus held, support springs 18 under tension and the cam blocks 22 at points where they will not engage the plungers 40. With the parts thus set the master switch 107 is closed, the switches 98 on the two machines are also closed and the motor of the first machine, for example machine B, is started. Thus this machine will function as ordinarily, the unwinding of film F from reel 11 causing said reel to rotate and to also rotate pulley 27—28. As this pulley is normally out of contact with disk 25 it can rotate freely.

When the time arrives to change over to the other machine so as to bring its film into action the flap 15 on machine B is released automatically so that slide 14 and cam 22 will snap into operative position. Thus at some time during one rotation of reel 11 the cam or block 22 will come against the end of plunger 40 and thrust said plunger longitudinally. This will simultaneously shift lever 33 to release disk 25 and also bring contact 43 against contact 42.

The described action of the plunger on the contacts results in starting the motor of machine C through the circuits provided and immediately thereafter the block 52 is pulled from under finger 50' of machine B by tensioned spring 31 which, immediately following the actuation of lever 33 and the release of disk 25, imparts a partial rotation to said disk sufficient to wedge one end portion of the wall of recess 26 between the disks 27 and 28 of the pulley. As a result of the foregoing action the green light of machine B is extinguished while the red light is turned on to indicate that disk 25 is functioning. Also, as a result of this action the disk 25 will be propelled positively by pulley 27—28 with the tension of spring 31 becoming gradually reduced until somewhat more than one-half rotation of the disk has taken place whereupon the tension of the spring will be gradually increased until the tooth 37 approaches the head 36 of lever 33 which, by this time, has been reset and will stop further rotation of the disk but will hold the spring under tension.

Following the described action of the light circuits of machine B block 48 comes against finger 47' and closes contact 47 against contact 46 to close the buzzer or signal circuit. Thus the operator is immediately notified that the changeover is about to occur.

Following the sounding of the signal the disk 25 of machine B continues to rotate and as it approaches the completion of its one rotation which is permitted, the block 57 comes against finger 56 and breaks the contact between 54 and 55 and closes the contact between 54 and 53. This results in closing the circuit to the solenoid 88 of machine C and breaking the circuit to solenoid 88 of machine B. At the same time the motor of machine B will be stopped. The action of the solenoids will be to open the dowser of machine C while the dowser of machine B will be closed automatically. Thus the film in the magazine of machine C will be brought automatically into play and during its operation another film can be supplied to the magazine of machine B ready to follow the film in machine C at the proper time.

It will be noted that the entire action of this apparatus is automatic and, as has already been stated, it becomes unnecessary to mark the films and they will not become marred in any way.

Obviously the sound can be changed over at the proper time by the action of block 62 on finger 61 which acts to break connection between contacts 59 and 60 of one sound apparatus and make contact between the parts 59 and 58 to bring the other sound apparatus into action. As the sound apparatus constitutes no part of the present invention it has not been disclosed in the present case.

What is claimed is:

1. Motion picture projection apparatus including separate projection machines, a motor for each machine, means controlled by the unwinding of a film in one machine for closing the circuit to the motor of the other machine, an electrically operated signal device, contacts electrically connected thereto, a spring actuated member, means for holding said member against movement, said means being actuated by the film controlled means to release the movable member for actuation by its spring, and means on said member for actuating one of the contacts.

2. Motion picture projection apparatus including separate projection means each having a dowser, an electric signal circuit including normally spaced contacts, an electric motor for each machine having a circuit including normally spaced contacts, dowser operating mechanism including an electric circuit having normally spaced contacts, a spring actuated movable member, separate means thereon for actuating respectively a contact of the signal and a contact of the motor and dowser circuits, means for holding said member against movement, and means controlled by the unwinding of a film in one machine for successively releasing said member for momentary actuation by its spring and for positively actuating said member relative to the contacts.

3. In a motion picture projection machine a reel shaft for actuation by an unwinding film, a compressible pulley rotatable with the shaft, a rotatable disk normally straddling the pulley circumferentially, means for locking the disk out of contact with the pulley, means controlled by the unwinding of the film for unlocking the disk, and means for automatically wedging the periphery of the disk into frictional engagement with the pulley when the disk is unlocked.

4. In a motion picture projection machine a reel shaft for actuation by an unwinding film, a compressible pulley rotatable with the shaft, a rotatable disk normally straddling the pulley circumferentially, means for locking the disk out of contact with the pulley, means controlled by the unwinding of the film for unlocking the disk, means for automatically wedging the periphery of the disk into frictional engagement with the pulley when the disk is unlocked, separate sets of circuit controlling contacts adjacent to the disk, and means carried by the disk for closing together the contacts of the respective sets in predetermined succession during the actuation of the disk by the pulley.

5. In a motion picture projection machine a reel shaft for actuation by an unwinding film, a pulley rotatable with the shaft, a rotatable disk normally straddling the pulley circumferentially, means for locking the disk against rotation and out of contact with the pulley, means controlled by the unwinding of the film for unlocking the disk, and a spring for imparting an initial rotation to the unlocked disk to wedge the periphery of the disk into frictional engagement with the pulley so as to be driven thereby.

6. In a motion picture projection machine a pulley, a rotatable disk normally straddling the pulley circumferentially, means for locking the disk against rotation and out of contact with the pulley, a film reel, means controlled by the unwinding of a film therefrom for unlocking the disk, means for imparting an initial rotation to the disk when unlocked to wedge the periphery of the disk into frictional engagement with the pulley, and means driven by the reel for rotating the pulley thereby to rotate the disk when frictionally engaged thereby.

7. In a motion picture projection machine a pulley, a rotatable disk normally straddling the pulley circumferentially, means for locking the disk against rotation and out of contact with the pulley, a film reel, means controlled by the unwinding of a film therefrom for unlocking the disk, a spring for imparting an initial rotation to the disk when unlocked to wedge the periphery of the disk into frictional engagement with the pulley, and means driven by the reel for rotating the pulley thereby to rotate the disk when frictionally engaged thereby and restore the spring to its initial tension.

8. In a motion picture projection machine a pulley, a rotatable disk normally straddling the pulley circumferentially, means for locking the disk against rotation and out of contact with the pulley, a film reel, means controlled by the unwinding of a film therefrom for unlocking the disk, a spring for imparting an initial rotation to the disk when unlocked to wedge the periphery of the disk into frictional engagement with the pulley, means driven by the reel for rotating the pulley thereby to rotate the disk when frictionally engaged thereby and restore the spring to its initial tension, separate sets of circuit controlling contacts adjacent to the disk, and means carried by the disk for closing together the contacts of the respective sets in predetermined succession during the actuation of the disk by the pulley.

9. Projection apparatus including separate projection machines each having a motor and a dowser, an electric signal device, a pulley on one of the machines, a rotatable disk normally straddling the pulley circumferentially, means for locking the disk against rotation and out of contact with the pulley, a film reel in said machine, means controlled by the unwinding of a film therefrom for unlocking the disk, means for imparting an initial rotation to the disk when unlocked to wedge the periphery of the disk into frictional engagement with the pulley, means driven by the reel during the unwinding of the film for rotating the pulley thereby to rotate the disk when frictionally engaged thereby, a set of contacts for controlling the signal, a set of contacts for controlling the operation of the dowsers of the two machines, a set of contacts for controlling the motor of the other machine, and means on the disk for operating a contact of each set.

10. Motion picture projection apparatus including separate projection machines, a motor for each machine, means controlled by the unwinding of a film in one machine for closing the circuit to the motor of the other machine, an electrically operated signal device, contacts electrically connected thereto, a movable member, means for actuating the same, means for holding said member against movement, said means being actuated by the film controlled means to release the movable member for actuation by its actuating means, and means on said member for actuating one of the contacts.

11. Motion picture projection apparatus including separate projection means each having a dowser, an electric signal circuit including normally spaced contacts, an electric motor for each machine having a circuit including normally spaced contacts, dowser operating mechanism including an electric circuit having normally spaced contacts, a movable member, means for operating the same, separate means on said member for actuating respectively a contact of the signal and a contact of the motor and dowser circuits, means for holding said member against movement, and means controlled by the unwinding of a film in one machine for successively releasing said member for momentary actuation by its operating means and for positively actuating said member relative to the contacts.

12. In a motion picture projection machine a reel shaft for actuation by an unwinding film, a pulley rotatable with the shaft, a rotatable disk normally straddling the pulley circumferentially, means for locking the disk against rotation and out of contact with the pulley, means controlled by the unwinding of the film for unlocking the disk, and means for imparting an initial rotation to the unlocked disk to wedge the periphery of the disk into frictional engagement with the pulley so as to be driven thereby.

13. In a motion picture projection machine a pulley, a rotatable member normally spaced from the pulley, means for locking the member against rotation and out of contact with the pulley, a film reel, means controlled by the unwinding of a film therefrom for unlocking the member, means for imparting an initial rotation to the member when unlocked to frictionally engage the pulley, and means driven by the reel for rotating the pulley thereby to rotate the member when frictionally engaged thereby and restore the member rotating means to its initial position.

14. In a motion picture projection machine a pulley, a rotatable disk normally straddling the pulley circumferentially, means for locking the disk against rotation and out of contact with the pulley, a film reel, means controlled by the unwinding of a film therefrom for unlocking the disk, operating means for imparting an initial rotation to the disk when unlocked to wedge the periphery of the disk into frictional engagement with the pulley, means driven by the reel for rotating the pulley thereby to rotate the disk when frictionally engaged thereby and restore the operating means to its initial position, separate sets of circuit controlling contacts adjacent to the disk, and means carried by the disk for closing together the contacts of the respective sets in predetermined succession during the actuation of the disk by the pulley.

ALBERT HARRISON WALKER.